Patented Apr. 12, 1932

1,853,397

UNITED STATES PATENT OFFICE

HENRY W. BANKS, 3D, OF NOROTON, CONNECTICUT, ASSIGNOR TO LOOMIS, STUMP & BANKS, OF NEW YORK, N. Y., A PARTNERSHIP

COLLOIDAL FUNGICIDAL METALLIC COMPOSITION AND METHOD OF MAKING THE SAME

No Drawing. Original application filed March 27, 1925, Serial No. 18,766. Divided and this application filed January 5, 1926. Serial No. 79,469.

This invention relates to improved compositions of matter adapted to be applied to plants or seeds for preventing or controlling the destructive action of plant parasites, such as parasitic fungi or insect pests, or the like, upon the plant organism. The compositions referred to in this connection include the well known fungicides and insecticides as well as disinfectants, fumigants and like materials, and are hereinafter frequently referred to collectively as parasiticides.

Most parasiticides contain, besides the active agent or parasitic poison or poisons, a medium or carrier which usually, though not necessarily, is inactive so far as any appreciable effect upon the parasite is concerned. Among the well known active agents or parasitic poisons of this character are the following, viz: finely divided or colloidal sulphur; sulphides or polysulphides, such as sulphide of lime (lime sulphur), ammonium polysulphide and the like; salts of the toxic metals, such as copper, nickel, mercury, silver, zinc, and the like; arsenates, such as lead arsenate, calcium arsenate, and the like; nicotine compounds, such as nicotine sulphate and the like; certain organic mercurials and arsenicals; cyanides, soaps; hydrocarbon oils, such as ordinary lubricating oils, or tar oils; creosote or creosote oil; and many other substances well known to those skilled in this art.

Among the principal objects of the present invention is the provision of improved parasiticides for applying to plants either directly as a dust or, after addition of water, as a spray. A further object is the provision of an improved medium or carrier for parasitic poisons which is conveniently obtainable in sufficiently large quantities for use in connection with the dusting or spraying of large groups of plants spread over wide areas, such as the cereal and cotton crops and the like. A third object is the provision of improved means and methods of incorporating the various known parasitic poisons with a suitable medium or carrier, either liquid or solid. A fourth object is to provide an improved medium or carrier for parasitic poisons, which is quite generally applicable for holding the various well known or standard parasitic poisons in a form suitable for dusting instead of spraying upon the plants thus enormously simplifying the present current methods of preparing, storing and applying parasitic poisons in general, and placing in the hands of the agriculturist or horticulturist a suitable parasiticidal dust for each standard parasitic poison which has substantially the same physical characteristics in each instance, thus adapting it to be applied to his different crops or plants by machinery of substantially the same general type or construction.

In my co-pending application, Serial No. 12,992, I have disclosed means for making a solid or powdered fungicidal sulphur composition comprising a water-absorptive material, preferably a bentonite clay, and finely divided sulphur distributed therethrough preferably in a colloidal or extremely finely divided state, the composition as a whole being suitable for application either as a dust or, after addition of water, as a spray.

In spray form this sulphur product consists of a suspension or colloidal solution of the sulphur in the water possessing unusually high fungicidal and insecticidal effectiveness.

Since making the above mentioned invention I have discovered that it is possible to prepare parasiticides from parasitic poisons in general by employing means similar to those disclosed in the above mentioned application and more particularly by bringing the various well known or standard parasitic poisons or active agents, preferably in a fluid or fluid-like state (i. e. liquid; vapor; solution; emulsion or suspension) into intimate contact with a substantially neutral or inert water-absorptive or jell-forming medium capable of holding the said poison or agent in a finely divided state, therein. I have found also that the parasitic poisons, particularly if in a fluid or fluid-like state, as mentioned above, become incorporated under these conditions with the bentonite or like medium in a form or state in which their effectiveness is not only not adversely effected by the medium but is frequently increased thereby and I believe that this absence of any deleterious effect on the poisons or increase in effectiveness thereof is due in part to the physical adsorption or absorption of the poison by the jell-forming medium probably in extremely minute pores therein and to the inert or neutral character of the jell-forming medium itself (bentonite or the like). Irrespective of any explanation of the exact nature of the interaction between the jell-forming medium such as bentonite and the parasitic poison, I have found it to be a fact that such poisons in general are taken up by such a medium particularly from a fluid or fluid-like state to form a parasiticide having the above mentioned desirable characteristics or properties.

Various other advantages and characteristics of my invention will appear more clearly from the following examples which are given by way of illustrating different embodiments thereof, it being understood that the solid product obtained in each example is to be applied to plants by dusting, or, after addition of water, as a spray.

*Example 1.*—16 grams of copper sulfate pentahydrate is dissolved in 200 cc. of water. An excess of ammonia is then added until the solution acquires the characteristic bright, clear, blue color of the complex copper ammonium compound. 200 grams of ordinary bentonite is now added to the ammoniacal copper solution and stirred until a thick paste is obtained. This mixture or paste is dried in any convenient manner to a dry cake and then ground to a powder by any suitable means, such as a ball-mill, to the desired degree of fineness. The product thus obtained is suitable for dusting directly upon plants or it may be taken up in water to form colloidal solution of the copper compound which may be applied to the plants as a spray in the usual manner.

*Example 2.*—Copper oleate is softened or dissolved with gasoline contained in an excess of bentonite and the gasoline subsequently removed by evaporation. The copper oleate and the mixture of gasoline and bentonite may be mixed with each other in any convenient manner. The proportion of copper oleate to bentonite may be varied within very wide limits from a fraction of a per cent of copper oleate to 75% by weight or more of the total mixture and the amount of gasoline employed may likewise be varied within wide limits but I prefer to use only that amount which is required to soften the copper oleate to such an extent that it can be readily dispersed in the solid bentonite by thorough mixing. After evaporating the gasoline from the mixture a dry cake is obtained which may be ground in a ball-mill or any other suitable device to obtain a dry powder of a fineness suitable for dusting upon the plants. This product also may be taken up with water and applied as a spray. When water is added to the dry powder or cake the copper is dispersed in the aqueous liquid in a fine state of subdivision corresponding to that of a true colloidal solution or suspension.

*Example 3.*—10 grams of copper resinate is dissolved in 20 cc. of benzene and 50 grams of oven-dried bentonite stirred into the solution until a thick paste is obtained after which the benzene is driven off by evaporation. The resulting product is a friable cake which is easily ground in a ball-mill to a very fine powder suitable for dusting upon the plants or which as in the preceding examples may be taken up in water and applied as a spray. The copper salt in this instance also is readily dispersible in water to form a colloidal solution or suspension of the copper compound therein.

*Example 4.*—Zinc resinate may be substituted for copper resinate in Example 3, the product obtained being in all essential respects similar in its physical properties to the product of the preceding example and may be applied to the plants either as a dust or a spray.

In Examples 2, 3, and 4 if the proportion of copper compound to bentonite is decreased from the proportions given in the examples a more friable dry cake is obtained which is somewhat easier to grind.

*Example 5.*—5 grams of nicotine sulfate solution (black leaf 40) is added to 100 grams of oven-dried bentonite and the mixture ground in a ball-mill or any other convenient grinding device. The product thus obtained is a very fine dust suitable for dusting directly upon the plants or for taking up in water to form a solution of the nicotine sulfate in the aqueous medium which may be sprayed upon the plants in the usual manner. Prior to grinding the above mixture it may be dried in any suitable manner to solidify the nicotine sulfate in the bentonite but usually the grinding operation brings about sufficient drying action to produce this same result unless excessive amounts of water are employed in making the original mixture.

*Example 6.*—10 grams of metallic mercury is placed in a suitable container with 100 grams of oven-dried bentonite and the mixture heated to about 360° C. to promote dispersion of the mercury through the bentonite in a vapor state. After cooling, the product thus obtained is of a uniform gray color and of substantially homogeneous composition except for a few small globules of mercury distributed irregularly through the mass. This dry mass may be ground to a dry powder as in the preceding examples to obtain a dust suitable for dusting upon plants or as in the preceding examples the dry mass may be taken up in water to form a colloidal emulsion or suspension of the mercury in the aqueous medium which is suitable for application to the plants as a spray.

*Example 7.*—Ordinary oven-dried bentonite is mixed with sufficient 10% silver nitrate solution to form a smooth paste and the mixture stirred until the ingredients are uniformly mixed. An excess of concentrated alkaline formaldehyde solution is now stirred into the paste and allowed to stand and the mixture dried in an oven at a temperature somewhat above 100° C. The resulting product is a dry friable mass which may be ground in a ball-mill as in the preceding examples to form a powder or paste suitable for dusting upon the plants or it may be taken up in water as in the preceding examples to form a colloidal solution of the reduced silver which is suitable for applying to the plants as a spray.

*Example 8.*—200 grams of bentonite is dried at about 100° C. to drive off the free moisture which usually amounts to about 10% by weight. The resulting dry bentonite is powdered and then placed in a stoppered bottle while still warm and about ½ gram of powdered iodine is added to the mixture and the stopper replaced. This warm dry mixture is now thoroughly mixed by shaking the bottle until all spots and of iodine have disappeared and it takes on a uniform light brown color.

*Example 9.*—25 grams of wood tar pitch is melted with 50 grams oven-dried bentonite and the mixture stirred until a smooth paste is obtained after which it is cooled and ground to a powder as in preceding examples. The powder thus obtained is suitable for dusting or spraying in the same manner described in the preceding examples.

*Example 10.*—5 cc. of ordinary lubricating oil is added to 100 grams of oven-dried bentonite and the mixture thoroughly stirred to distribute the lubricating oil throughout the mass of bentonite. This mixture is then warmed in an oven to about 100° C. so as to decrease the viscosity of the oil and permit it to penetrate into or become absorbed by the bentonite. The resulting product is then allowed to cool and is then ground to a powder suitable for dusting upon the plants. In this instance also the powder may be taken up with water and applied as a spray to plants in the usual manner.

It will be understood also that any of the dry or powdered products obtained in the preceding examples may be mixed with one another so as to combine insecticidal and fungicidal properties in the same dust. It will also be understood that I may combine two bentonite dusts each containing a dry soluble material which will react with the material in the other dust upon exposure to moisture to form any desired reaction product in situ in the mass of bentonite; thus for example, I may add a sufficient amount of a solution of a soluble copper salt to a mass of powdered bentonite to produce a product which still retains its powdery nature and mix with a similar powder containing a soluble carbonate solution absorbed therein and then mix the two powders by thoroughly grinding them together. When moistened this product will produce a colloidal dispersion of copper carbonate distributed throughout the mass of bentonite.

It will be understood that I may substitute copper stearate for the copper oleate in Example 2. I may also substitute free nicotine base for nicotine sulfate solution in Example 5.

I have discovered the surprising fact that the dry cake or powdered product obtained in each of the foregoing examples contains the parasitic poison or active agent dispersed in the bentonite in such state or condition therein that when water is added to the product the parasitic poison or active agent is taken up by the water (along with the bentonite) to form a stable suspension or emulsion of the active agent in the water. The aqueous suspension thus obtained I have found to be very effective as a parasiticide for controlling the parasitic diseases of plants or seeds when applied as a spray in the usual manner, but I prefer to apply these products in dust form just as obtained in the above examples without the addition of water thereto. I believe, however that the fact that these dry products are so readily taken up by water to form suspensions or emulsions is one of the reasons why they are so effective when applied dry to the plants since the moisture of ordinary humid air or from dew or rain causes the active agents in the product to become dispersed in an extremely finely divided state in the water as a suspension or emulsion in which form they tend to spread uniformly over the entire surface of the plant adjacent the individual particles whereby their protecting or control action is increased. When a limited amount of moisture is present I have found that the products form a jelly-like mass which also tends to spread over the plant surface but which is not readily washed off the plant by the action of later added amounts of water from rains, etc. thus increasing the effectiveness of the material for control purposes.

Prior to applying them to the plants the dry or powdered products of the above examples may be mixed in any desired proportion with finely ground sulphur (preferably of a fineness to pass a 200 mesh sieve) or other suitable carrier, either active or inactive as a parasitic poison, such as ground or comminuted blast furnace slag, kaolin, copper carbonated, bentonite, calcium arsenate or similiar materials adapted for dusting purposes and all well known to those skilled in this art.

It will be understood that this invention is not restricted to the particular means and methods set forth in the above examples but that I may make various changes and substitutions therein without departing from the scope of my invention in accord with the general broad features thereof as described elsewhere herein and as set forth in the appended claims. Thus, for instance, although I prefer to employ bentonite as the dispersing medium for the various parasitic poisons as set forth in the examples, nevertheless my invention is not limited to this medium but I may substitute any medium therefor which possesses similar water-absorptive or jell-forming properties and which is capable of similarly absorbing or adsorbing the parasitic poisons.

Also I may vary the proportion of parasitic poison to bentonite between wide limits according to circumstances or according to the toxic effect desired or required for any particular use, it being understood that the amount of active agent used per plant or per unit area of plant surface or per acre of any given crop is ordinarily the same as that now generally used for the same active agent or agents when applied in accordance with the methods commonly used prior to the present invention, except that in those cases where my improved product contains the active agent in a finer state of sub-division than in the parasiticides known hitherto, a correspondingly smaller amount may generally be employed.

It will be observed that in the examples given above I subject the parasitic poison or active agent in a fluid or fluid-like state (liquid, gas, solution, suspension or emulsion) to the action of the solid or powdered bentonite and this is the procedure that I prefer but I may bring the two principle constituents into intimate contact with each other in any other convenient or suitable manner as by grinding the two solid constituents together, although the results thus obtained are then generally not as satisfactory as when the preferred procedure is employed.

Also in some instances as when the active agent cannot be readily liquified or vaporized I may form a fluid-like suspension of the active agent (e. g. lead arsenate) in situ in the bentonite by mixing together two bentonite pastes, one containing the soluble salt of a toxic metal (such as lead acetate) and the other the soluble precipitating agent such as sodium arsenate, the active agent (lead arsenate in this instance) being formed as a fluid-like suspension in the water of the mixed pastes. After drying the mixed pastes a dry solid is formed containing the lead arsenate as a solid dispersed in the dry bentonite. This procedure where possible is to be preferred to mere grinding together of the solid bentonite and the solid active agent when the latter is not readily convertible into a fluid state by liquefaction, vaporization or solution in a solvent. Also in such cases, I may prepare a suspension of the non-fluid insoluble active agent in an oil or oleagenous liquid and absorb the oily suspension thus obtained in the dry bentonite as in the case of a liquified active agent such as liquid copper oleate or liquid lubricating oil, using preferably somewhat less than that amount of oily suspension which produces a sticky or pasty product so as to obtain a cake which is readily reduced to a dry powder suitable for dusting upon the plants or for applying as a spray after addition of water thereto.

When an oily suspension of the active agent is absorbed in bentonite in this way I prefer to heat the mixture of bentonite and the oily suspension to reduce its viscosity somewhat so that it is more readily absorbed by the bentonite and also so that the whole mixture can be more readily reduced to a dust or powder after cooling.

It will be understood that the product obtained in the foregoing examples when water is added to the solid mixture is a true colloidal solution of the parasitic poison in the sense in which this term is now commonly employed and that the average size of the main portion of the dispersed parasitic poison is less than about one thousandth of an inch.

But the invention is not limited to solutions or liquids in which the particle size of the parasitic poison is less than the limit just mentioned, the essential feature in this respect being that those parasitic poisons which are ordinarily insoluble in water are by means of the present invention rendered effectively soluble for purposes of spraying.

While the present invention is intended primarily for use in connection with the control of the parasitic diseases of plants it will be understood that it may also be employed to advantage in connection with the control of similar parasitic diseases of animals including those due to insect pests as well as those due to fungi and the like and the invention may likewise be employed in connection with the extermination or control of household pests.

This application is a division of my co-pending application Serial Number 18,766 filed March 27, 1925.

I claim:

1. A parasiticide comprising a substantially dry colloidal clay of the bentonite type and a toxic metallic compound solidified from a fluid state in situ in the bentonite clay.

2. A parasiticide comprising a bentonite clay and a copper compound solidified from a fluid state in situ in the bentonite clay.

3. In a method of preparing a colloidal copper-containing substance the step which comprises subjecting an inorganic water-absorptive jell-forming medium to the action of a copper-containing fluid thereby producing a dispersion of the copper-containing fluid throughout the medium.

4. In a method of preparing a colloidal copper-containing substance, the step which comprises subjecting a bentonite clay to the action of a copper-containing fluid, thereby producing a dispersion of the copper-containing fluid throughout the bentonite clay and subsequently precipitating a copper-containing solid from the fluid in situ in the bentonite clay.

5. In a method of preparing a colloidal copper compound the step which comprises subjecting a bentonite clay to the action of an ammoniacal solution of a copper compound, thereby producing a dispersion of the ammoniacal copper solution throughout the bentonite clay and subsequently removing ammonia from the solution thereby precipitating a copper compound from the ammoniacal copper solution in situ in the bentonite clay.

6. In a method of preparing colloidal basic copper carbonate, the step which comprises mixing together a bentonite clay and an ammoniacal solution of copper carbonate and subsequently evaporating ammonia from the ammoniacal solution thereby precipitating a basic copper carbonate in situ in the bentonite clay and producing a dispersion of solid copper carbonate throughout the bentonite clay.

7. In the method of preparing a parasiticidal metal-containing composition in a pulverulent state the steps which comprise bringing a fluid parasiticidal metal-containing substance into intimate contact with a medium comprising an inorganic water-absorptive jell-forming substance and subsequently converting the fluid metal-containing substance into a solid metal-containing substance in situ in the medium.

8. In the method of producing a parasiticidal metal-containing composition in pulverulent condition the steps which comprise bringing a fluid parasiticidal metal-containing substance into intimate contact with a medium comprising bentonite and subsequently converting the fluid metal-containing substance into a solid metal-containing substance in situ in the bentonite.

In testimony whereof I affix my signature.

HENRY W. BANKS, 3D.